US007320121B2

(12) United States Patent
Krueger

(10) Patent No.: US 7,320,121 B2
(45) Date of Patent: Jan. 15, 2008

(54) COMPUTER-IMPLEMENTED SYSTEM AND METHOD FOR GENERATING EMBEDDED CODE TO ADD FUNCTIONALITY TO A USER APPLICATION

(75) Inventor: Steven E. Krueger, Raleigh, NC (US)

(73) Assignee: SAS Institute Inc., Cary, NC (US)

( * ) Notice: Subject to any disclaimer, the term of this patent is extended or adjusted under 35 U.S.C. 154(b) by 516 days.

(21) Appl. No.: 10/210,831

(22) Filed: Aug. 1, 2002

(65) Prior Publication Data

US 2004/0025148 A1 Feb. 5, 2004

(51) Int. Cl.
*G06F 9/44* (2006.01)

(52) U.S. Cl. ...................... 717/106; 717/107; 717/108; 717/109

(58) Field of Classification Search ........ 717/106-109, 717/139-140; 313/315-316; 706/61, 908, 706/93, 934
See application file for complete search history.

(56) References Cited

U.S. PATENT DOCUMENTS 4,342,082 A 7/1982 Brown et al.
5,170,465 A * 12/1992 McKeeman et al. ........ 717/145
5,432,795 A 7/1995 Robinson
5,455,949 A 10/1995 Conder et al.
5,487,132 A * 1/1996 Cheng ......................... 706/45
5,627,981 A 5/1997 Adler et al.
5,724,564 A 3/1998 Conder et al.
5,761,407 A 6/1998 Benson et al.
5,761,467 A 6/1998 Ando
5,761,513 A 6/1998 Yellin et al.
5,832,202 A 11/1998 Slavenburg et al.
5,881,280 A 3/1999 Gupta et al.
6,067,577 A 5/2000 Beard (Continued)

OTHER PUBLICATIONS

Wirth, "Algorithms & Data Structures", 1986.*
Lischner "Delphi In a Nutshell" 2000, O'Reilly & Associates, Inc., pp. 1194,380-382. As retrieved from http://www.netlibrary.com Jan. 6, 2005.*

(Continued)

*Primary Examiner*—Meng-Al T. An
*Assistant Examiner*—Jason Mitchell
(74) *Attorney, Agent, or Firm*—Jones Day

(57) ABSTRACT

A computer-implemented system and method for generating code. The system and method receive source code that includes a higher order computer language statement. Machine code is generated from the received source code. The generated machine code is placed directly into volatile memory for access by a computer program.

68 Claims, 17 Drawing Sheets

U.S. PATENT DOCUMENTS 6,247,117 B1 6/2001 Juffa
6,247,169 B1 6/2001 DeLong
6,260,190 B1 7/2001 Ju
6,353,818 B1 * 3/2002 Carino, Jr. .................... 707/2
6,353,820 B1 * 3/2002 Edwards et al. ............... 707/2
6,412,109 B1 6/2002 Ghosh
6,427,228 B1 * 7/2002 Wigger ....................... 717/111
6,487,716 B1 11/2002 Choi et al.
6,625,797 B1 9/2003 Edwards et al.
6,634,023 B1 10/2003 Komatsu et al.
6,772,413 B2 * 8/2004 Kuznetsov .................. 717/136
6,848,111 B1 1/2005 Schwabe et al.
6,918,030 B2 7/2005 Johnson
7,003,762 B2 2/2006 Krueger

OTHER PUBLICATIONS

Black, David L. et al., "The Mach Exception Handling Facility", ACM, pp. 45-56, 1988.

Bringmann, Roger A. et al., "Speculative Execution Exception Recovery using Write-back Suppression", IEEE, pp. 214-223, 1993.

Cristian, Flaviu, "A Recovery Mechanism For Modular Software", IEEE, pp. 42-50A, 1979.

* cited by examiner

Relocation Types.

204

```
TKBPStatus TKBPmemfind(TKBPindexh ins, TKBPfindParms *parmsp, TKJnlh jnlh,
TKChar name )
{
 TKEPMNum  curPage,oldPage;
 TKBPindexNodeh curInode;
 TKBPleafNodeh  curLnode;
 TKBPtypeNodeh  curNode;
 int          found=FALSE,i,l,m,u,result,rc;
 char         *cpKey,*lowKey,*dataPage;
 void         *rval;

 if (ins->fh) { curPage = (TKEPMNum) ins->headnode;  curNode =
tkepmLockPageRead(ins->fh->tableh, curPage);  }
 else {     curNode = ins->headnode;   }
 while(!(found)) {
   if (ins->allowcurr) {       rc = tktLockGet(curNode->lock,FALSE,TRUE);     }
     if (curNode->leaf) {    curLnode = (TKBPleafNodeh) curNode;
       if (ins->allowcurr) {
         cpKey = ((char*)curLnode) + ins->leafNodeSize + curLnode->valnode[curLnode-
>count-1].keyloc;
       /* move.right? */
       if(ins->compare(ins, parmsp->key, cpKey) > 0) {
         if (curLnode->next) { curNode  = (TKBPtypeNodeh) curLnode->next;    rc =
tktLockRelease(curLnode->lock);  continue;
         }     else {  return (TKBP_NOTFOUND); } } }
     if (curLnode->count < 10) { /* sequential */
       for (i=0;i<curLnode->count;i++) {
         cpKey = ((char*)curLnode) + ins->leafNodeSize  + curLnode->valnode[i].keyloc;
         if(ins->compare(ins, cpKey, parmsp->key) == 0) {
           if (ins->fh) {
             dataPage = tkepmLockPageRead(ins->fh->tableh,  ((TKEPMNum)curLnode-
>valnode[i].page));
.
.
.
 if (ins->indexh->allowdups) {
           if (curLnode->valnode[m-1].prev) {
             ins->lastvalnode = curLnode->valnode[m-1].prev;
```

```
int find(TKBPindexh ins, TKBPfindParms *parmsp) {
TKBPindexNodeh curInode; TKBPleafNodeh curLnode;TKBPtypeNodeh curNode;
int found=FALSE,m,l,u;  TKBPvalNode *vn;
TKBPkeyNode *kn; double *a, *b;  char *cpKey, *bp;
curNode=ins->headnode;
while(!(found)) {
 if(curNode->leaf) {
  curLnode=(TKBPleafNodeh)curNode;
  a = (double *) parmsp->key;  l=0;
  u=curLnode->count-1;
  bp = ((char*)curLnode) + ins->leafNodeSize;
  vn = &curLnode->valnode;
  while (l<=u) {
   m=(l+u)/2;
   b = (double *) (bp + vn[m].keyloc);
   if (*a > *b) { l = m + 1; continue; }
   if (*a < *b) { u = m - 1; continue; }
   vn += m;
   parmsp->rval = (void *)(vn->page+vn->offset);  parmsp->rvalsize = vn->size;
   return(TKBP_OK);  }
   return (TKBP_NOTFOUND);   }
 else {
  curInode = (TKBPindexNodeh) curNode;    l=0;  u=curInode->count-1;
  bp = ((char*)curInode) + ins->indexNodeSize;  kn = &curInode-keynode;
  a = (double *) parmsp->key;
  while (l<=u) {
   m = (l+u)/2;  b = (double *) (bp + kn[m].keyloc);
   if (*a > *b) {l = m + 1; continue; }
   if (*a < *b) { u = m - 1; continue; }
   m++; break;  }
  if (*a > *b) { if (m != curInode->count) {m++; } } }
  if (m==0) {curNode = curInode->next; }
  else {curNode = kn[m-1].next; }
}
return (TKBP_HUH); }
```

FIG. 9

COMPUTER-IMPLEMENTED SYSTEM AND METHOD FOR GENERATING EMBEDDED CODE TO ADD FUNCTIONALITY TO A USER APPLICATION

CROSS-REFERENCE TO RELATED APPLICATIONS

This application is related to co-pending United States patent application entitled "Computer-Implemented Exception Handling System and Method," filed on Aug. 1, 2002, and having Ser. No. 10/210,438.

TECHNICAL FIELD

The present invention relates generally to computer code generation and more particularly to computer code compiling.

BACKGROUND

Most computer programs require preexisting object files in order to execute their instructions. If the programs' instructions were to change, then typically the programs' underlying source code is modified off-line and recompiled into an object file stored on a computer hard disk. The modified program is then available for execution.

SUMMARY

In accordance with the teachings disclosed herein, a computer-implemented system and method are provided for generating code. The system and method receive source code that includes higher order computer language statements. Machine code is generated directly into RAM from the received source code.

BRIEF DESCRIPTION OF THE DRAWINGS

FIG. 8 is source code output depicting a search function generated without the code generation system;

FIG. 9 is source code output depicting a search function generated via the code generation system;

DETAILED DESCRIPTION

Figure 1:
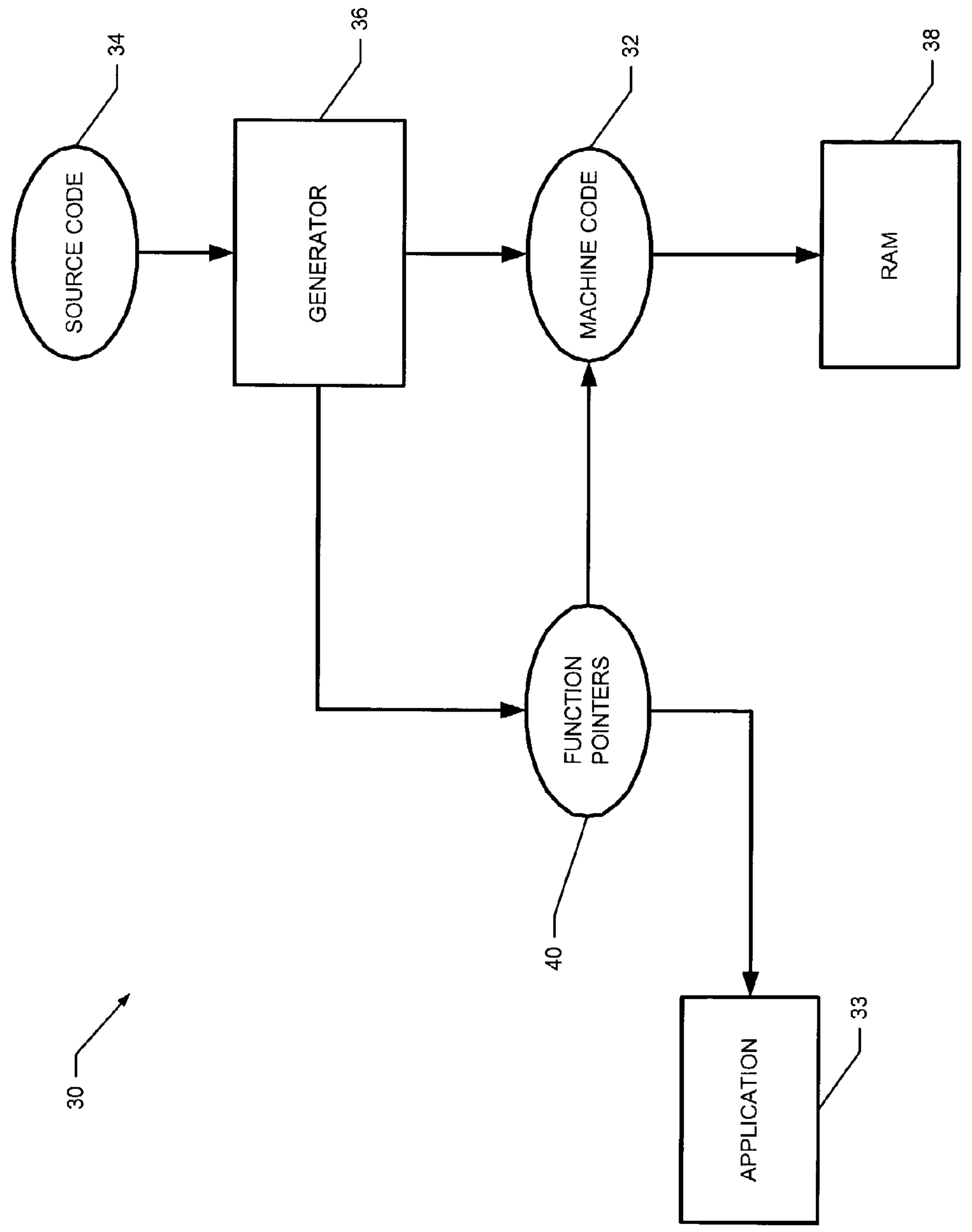
FIG. 1 is a block diagram depicting software and computer components used in generating code.

FIG. 1 depicts a computer-implemented system 30 that generates machine code 32 at run-time for use by an application 33. Source code 34 (containing functions needed by the application 33) is provided to a code generator software module 36. The module 36 generates machine code 32 directly to random access memory 38 (RAM) from the source code 66 and allows the application 33 to access the functions contained in the machine code 32.

As an example, the application 33 may wish to run a data search. The source code 34 to handle the data search is created during run-time of the application 33. The module 36 generates directly to RAM the machine code 32 from the data searching source code 34. The generator 36 makes available function pointers 40 so that the application 33 may call the data searching functions contained within the machine code 32. The application 33 can call these function pointers 40 as it would any other function pointer.

Figure 2:
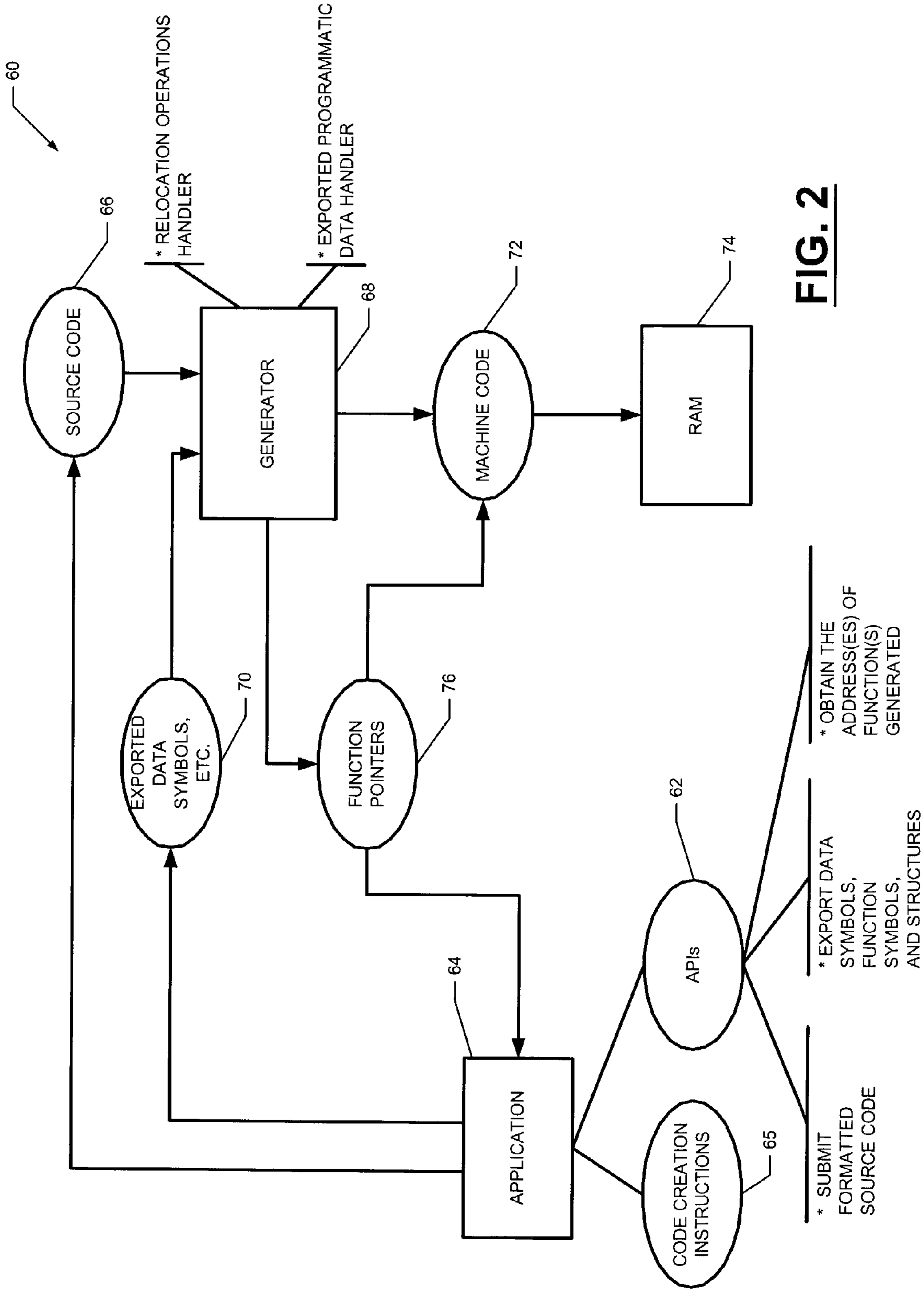
FIG. 2 is a block diagram depicting application programming interfaces used in generating code.

FIG. 2 shows another code generation system 60 wherein application programming interfaces 62 (APIs) are used an application 64 to interact with the generator 68 and the machine code 72. In this system, the application 64 contains instructions 65 to create source code 66 on-the-fly. The application submits the source code 66 to the generator 68 via one of the APIs 62. The submitted source code 66 may be formatted as ASCII text (or some other format recognizable by the generator 68) and may be in any higher order language (e.g., C, C++, FORTRAN, Pascal, assembly, etc.).

The application 64 may also use the APIs 62 to export data symbols, function symbols, and structures 70 so that they may be used during the machine code generation process. This is done when the generated code stream 72 needs to call back into the code of the application 64. To support this, the application 64 is allowed to export code symbols 70 in the form of function pointers, to the generator 68. When the generated code stream 72 needs to have access to data in the application program 64, the application 64 may export data to the code stream 72.

The generator 68 creates the machine code 72 from the source code 66 and from the exported information 70 and places the machine code stream 72 into RAM 74 as the machine code 72 is generated. It is noted that the generated machine code 72 is fully resolved and contains physical memory addresses. Also generated and included in the code stream 72 is any data required by the generated machine code. The generator 68 creates function pointers 76 so that the application 64 may locate where the functions are located in RAM 74.

Because the generated machine code 72 goes directly into memory 74 instead of to an object file, there are no "link" or "load" phases, so relocation is performed during the generator's compiling process. The specific types of relocations are dependent on the target machine, but illustrated in FIG. 3 are several general types of relocations that are resolved by the code generation system.

Figure 3:
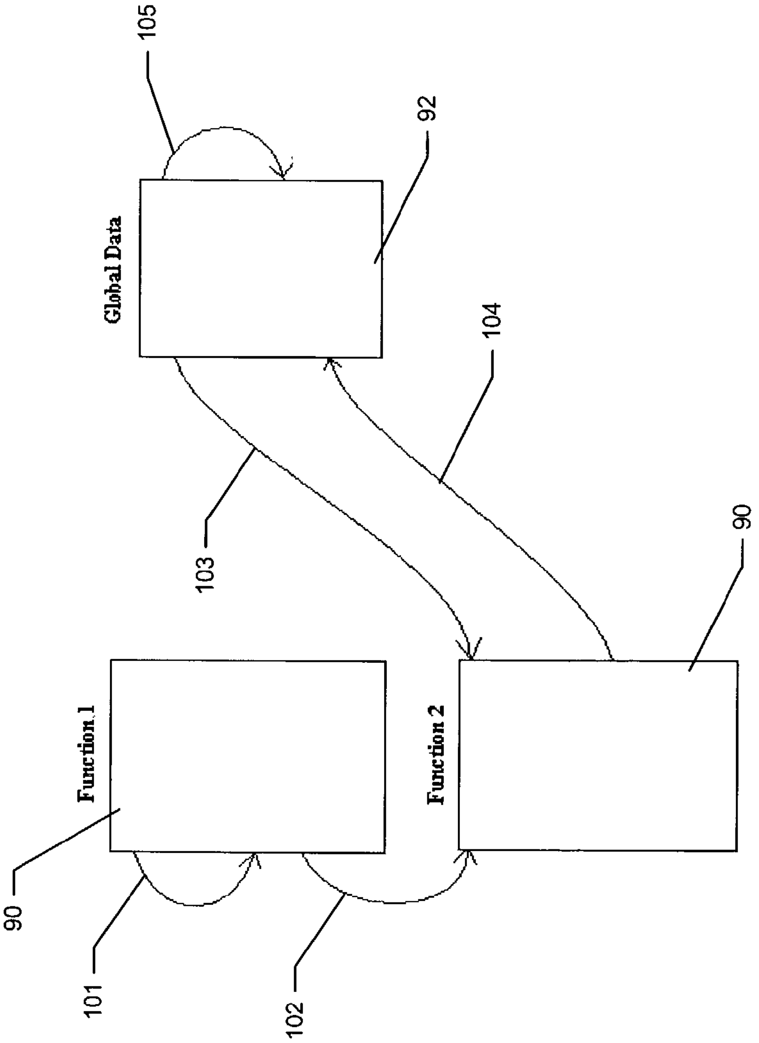
FIG. 3 is a block diagram depicting relocation types.

FIG. 3 depicts several different relocation operations types that may be used when the generator creates functions 90 or global data 92. More specifically, relocation addresses the situation when a generated function wishes to access another generated function or a generated function wishes to access generated global data. For example, relocation occurs when there is code to code relocation inside of a generated function as shown at reference number 101. These are used for conditional and unconditional branches, and may be absolute or pc-relative, depending on the platform.

As shown at reference number 102, another type of relocation is code to code relocation between generated functions. This is used for function calls or for taking the address of another function (so that it can point to the start of the function). Reference number 103 illustrates data to code relocation so that statically initialized pointers may point to the start of a function. Reference number 104 illustrates code to data relocation to obtain the address of a member of global data. Reference number 105 illustrates data to data relocation so that statically initialized pointers may point to data.

Figure 4:
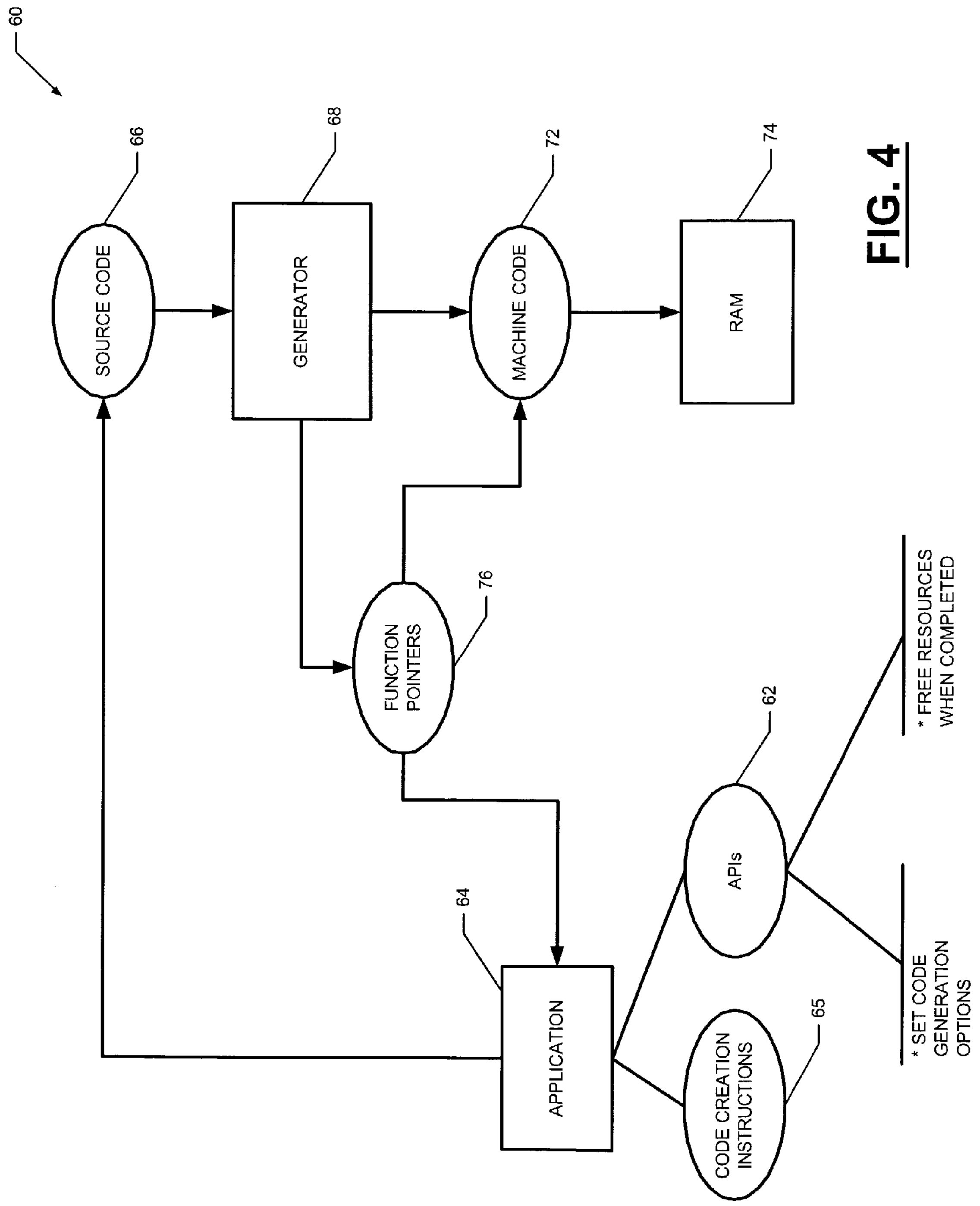
FIG. 4 is a block diagram depicting additional exemplary application programming interfaces utilized in generating code.

FIG. 4 shows examples of different APIs 62 that an application 64 may use in generating the machine code 72 that it needs. The APIs 62 may include a method for an application to set code generation options. For example, a code generation option may indicate whether the generator 68 optimizes the machine code 72. Another option may be to specify that a different on-the-fly code generator be used (such as one to handle a different type of source code language). The APIs 62 may include a method to free some or all of the resources needed by the code generator, including the memory associated with the code stream.

Figure 5:
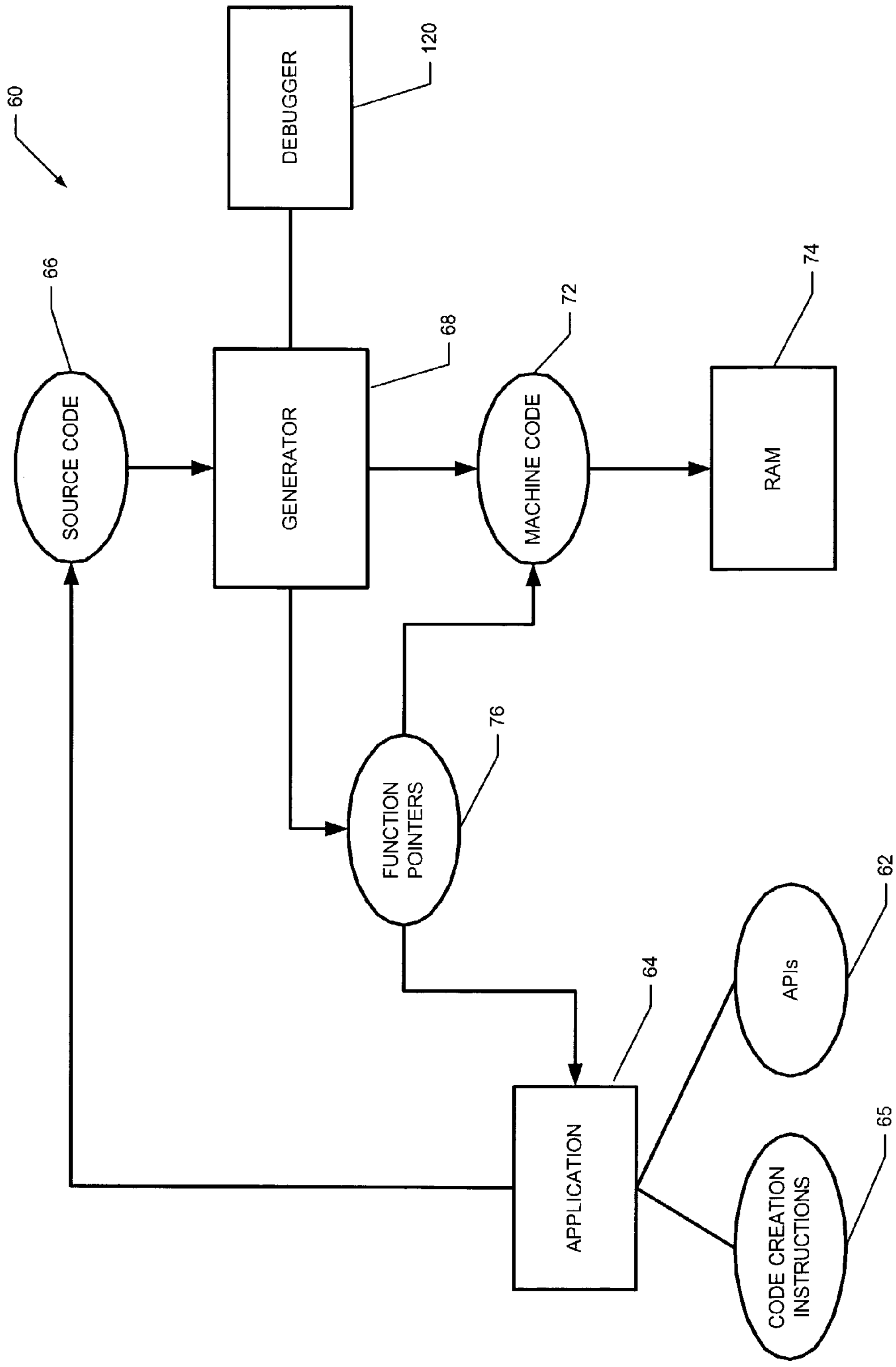
FIG. 5 is a block diagram depicting a debugger utilized in the code generation process.

FIG. 5 depicts a debugger 120 to assist a user in analyzing performance or errors that arise during the compiling of the source code 66 or execution of the machine code 72. For these debugging operations, another region of memory is used to describe the machine code 72. The debugger 120 accesses this memory region to retrieve and provide the description to the user.

The description allows the input source code 66 to be shown alongside of the machine code instruction(s) 72 to be executed. The description contains the current data values and the machine code instruction that is next to be executed. In this way, a user can analyze step-by-step the operation of the machine code 72. The debugger 120 may also access the code within the application 64 so that a user may examine the effect the application's execution has upon the machine code 72.

Figure 6A:
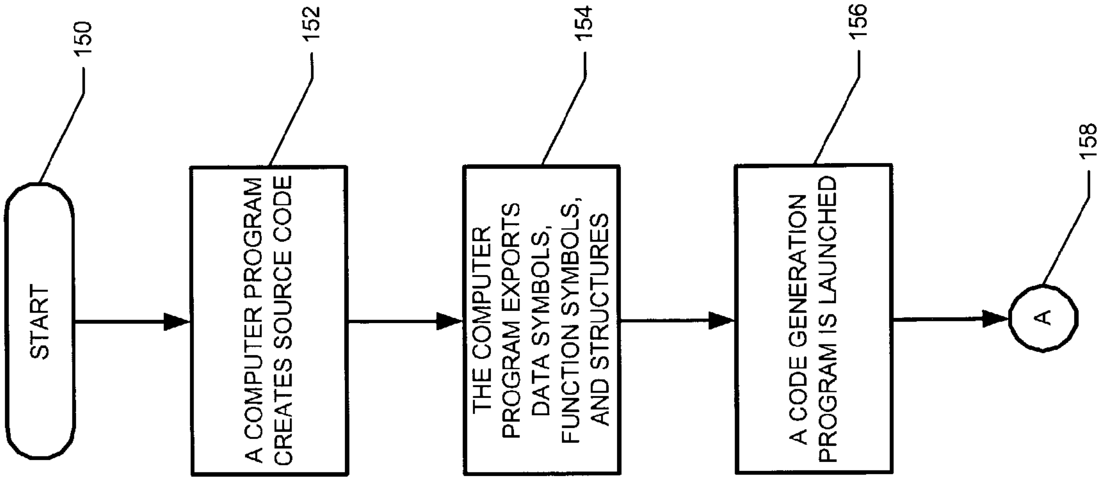
FIGS. 6A and 6B are flowcharts depicting exemplary operational steps for code generation.
Figure 6B:
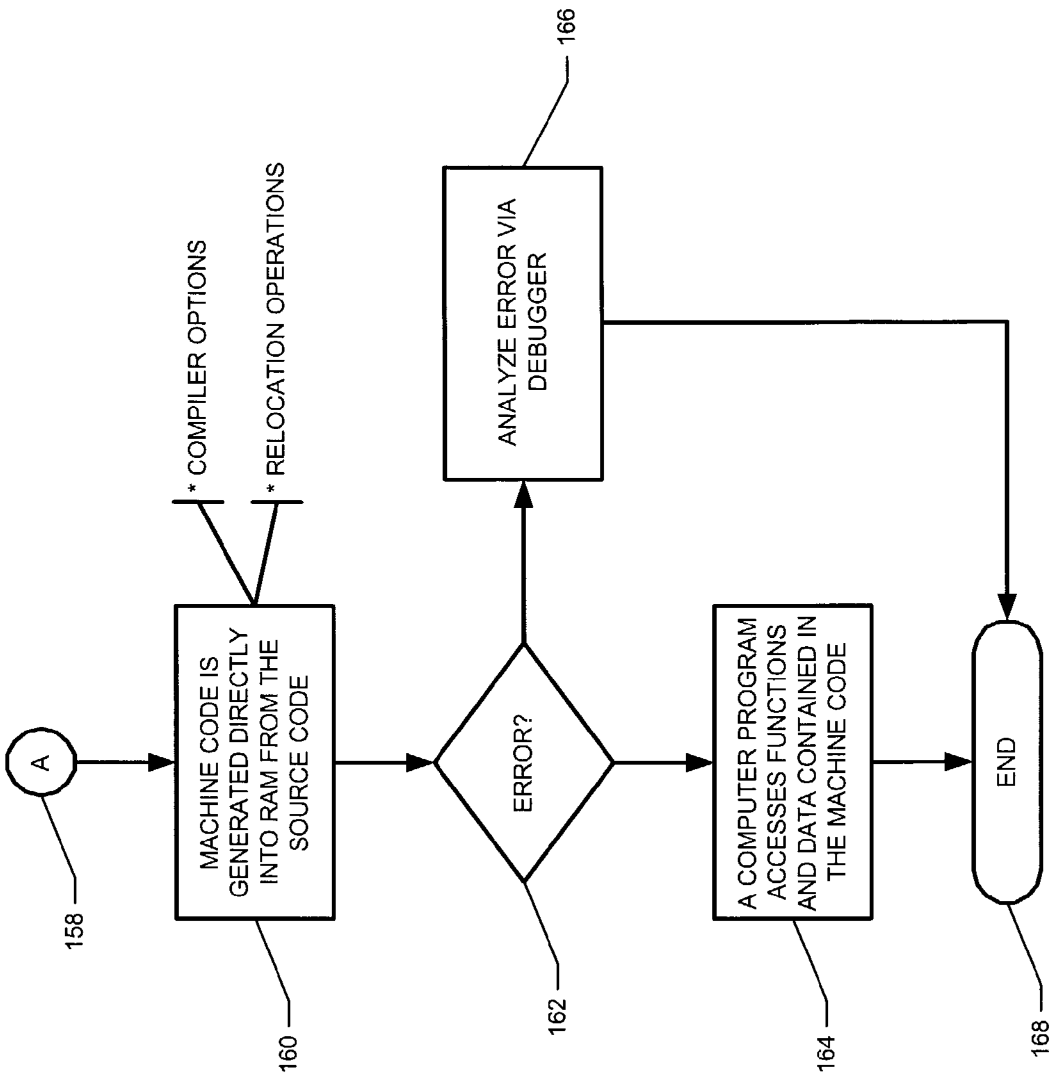

FIGS. 6A and 6B depict exemplary operational steps for code generation. With reference to FIG. 6A, start indication block 150 indicates that process block 152 is executed. At process block 152, a computer program creates source code that is to supply one or more desired functions. The computer program exports data symbols, function symbols, and structures at process block 154. At process block 156, the computer program launches a code generation program in order to process the newly created source code. It should be understood that many other ways exist for handling the execution of the code generation program, such as not having the computer program launch the code generation program, but having the code generation program in a hibernation state waiting to be invoked by the computer program.

Continuation block A 158 indicates that processing continues on FIG. 6B at process block 160. With reference to FIG. 6B, machine code is generated directly into RAM from the source code at process block 160. Process block 160 considers during the compiling of the source code any compiler options supplied by the application as well as handling any relocations needed.

Any errors arising during compiling are detected by decision block 162. If no errors arise, then at process block 164 the computer program accesses the functions and data contained in the machine code. Processing in this operational scenario terminates at end block 168. If an error did arise during compilation, then the error is analyzed via the debugger at process block 166.

Figure 7:
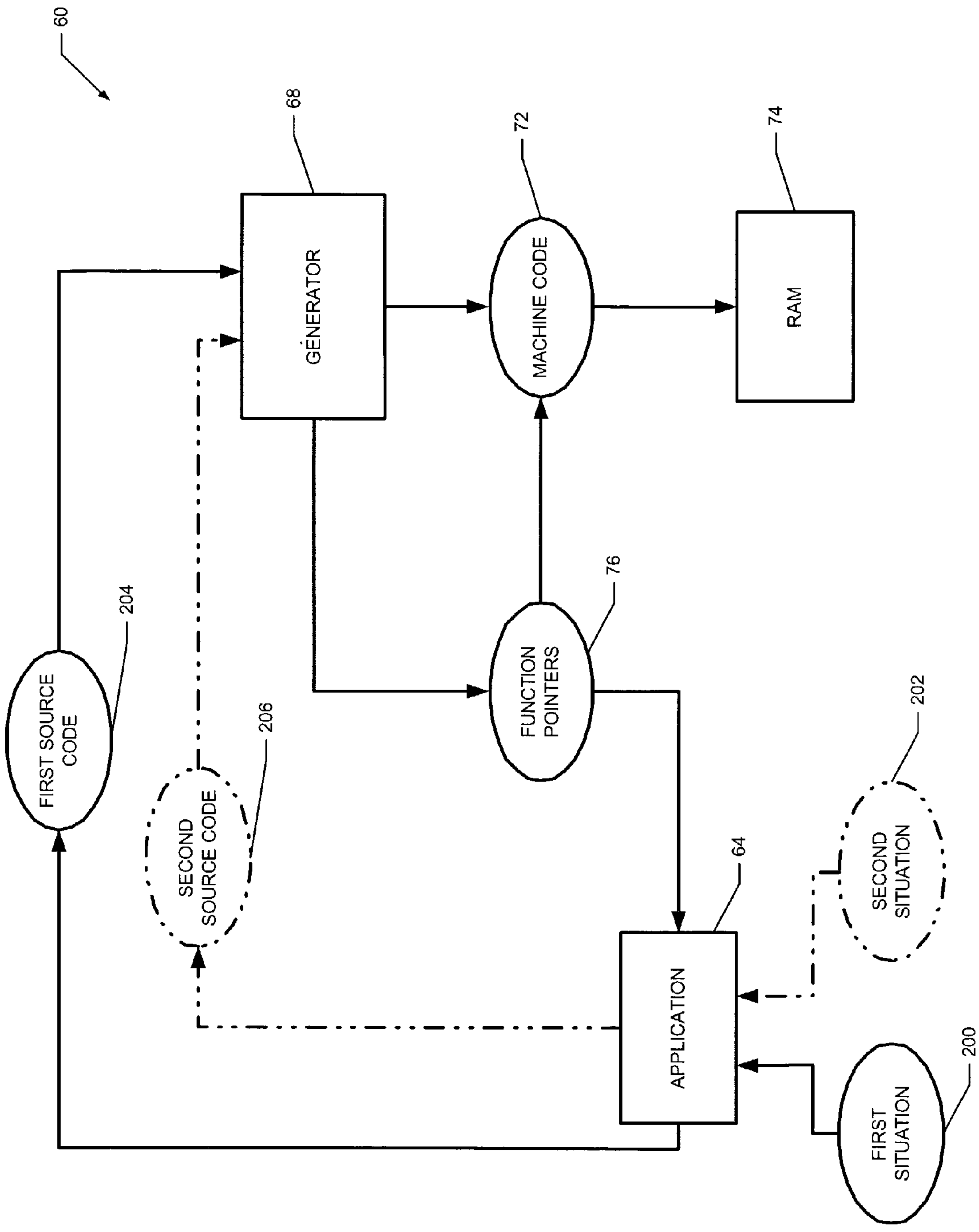
FIG. 7 is a block diagram depicting an exemplary application of the code generation system.

FIG. 7 depicts an exemplary use of the code generation system 60. In this example, the application 64 generates different lines of source code depending upon the type of situation it encounters. The application 64 contains code to detect whether a first situation 200 or second situation 202 has occurred. If the first situation 200 occurs, then the application 64 generates first source code 204 for conversion into machine code 72. If the second situation 202 occurs, then the application 64 generates second source code 206 for conversion into machine code 72. For example, the application 64 may generate the instructions for the first source code 204 in order to more efficiently handle one type of data (e.g., real numbers), whereas it will generate different instructions for the second source code 206 to more efficiently handle a different type of data (e.g., text). In such a way, the code that works best in a particular situation is used. It should be understood that the code generation system 60 is not limited to only two types of situations, but may include any number that reflects the situation at hand. The instructions of the first and second source code (204 and 206) may differ in that each source code alters a general algorithm differently to better tailor the algorithm for the specifics of its own situation. For example, the application 64 may alter differently a B*tree searching algorithm to improve the searching of different types of data depending upon the situation at hand.

FIGS. 8 and 9 illustrate how an application may alter source code from a typical algorithm. FIG. 8 shows source code instructions that were generated based upon a typical B*tree search algorithm without using the code generation system. The source code of FIG. 8 has to account for many different scenarios as it has not been honed for a particular situation.

FIG. 9 shows a set of more efficient source code instructions that were generated via the code generation system. The source code of FIG. 9 illustrates that the code generation system can be used to generate more efficient source code in that it has been tailored during runtime to better fit the situation at hand. For example, the source code of FIG. 9 has been customized for a B*tree search with a key type of double and with no concurrency. The application discerned the data sorting situation it was confronted with and used the APIs to generate the source code of FIG. 9.

Situations may become even more complicated as a B*tree computer program may request an unlimited variety of key-types and data-types. Coding for all the possibilities without the code generation system is quite complex and inefficient. The code generation system provides a way to generate customized code for the particular B*tree situation at hand. The following provides specific exemplary considerations that may be used in deciding how to create the optimal source code for the B*tree situation at hand:

Concurrency: Concurrent operations provide the ability to allow multiple threads access to the same tree at the same time. The code to provide concurrent operations is very complex. The complexity reduces performance. There are cases when concurrency is not desired by the consumer Source code may be generated to provide the ability to include or not include the code required to provide concurrent operations. This ability to customize on the fly significantly enhances the efficiency of the B*tree.

Key Type: Consumers of the B*tree request a variety of key types. Each key type requires a compare function. The compare functions are attached to the instance handle of the of B*tree. The code generation system provides a way for the compare code to be generated in-line thus eliminating the need for compare function calls. Also, the in-line generated code is customized for the dimension count and complex keys having more than one data type.

Dimension Count: A key type has a dimension count. In the simplest case the dimension count is "one" and the compare involves a single comparison. The code generation system may be used to eliminate the need for a dimension count dependent for-loop, thereby greatly improving the compare code's performance.

Paging: Traditional B*trees are pagable however the consumer may be provided with the ability to request no paging if she is dealing with an index that can fit entirely in-memory. In-memory B*tree's performance is greatly improved due to the fact that secondary storage is not required.

Duplicate Keys: Traditional B*trees do not entertain the notion of duplicate keys. A B*tree generated via the code generation system can, allow multiple inserts of the same key. The code generation system provides the consumer with the ability to generate or not generate code for this functionality.

The following discusses different APIs that an application may wish to use in relation to the code generation process. The application may wish to have access to an API that creates a code generator instance as well as to APIs that provide code generator service routines. Such code generator service routines may be used to: define external functions and data items; define structures; define preprocessor macros; convert a compile-time macro to a string that can be added to the source buffer; set compiler options from a string; set a compiler option; obtain the current value of a compiler option; enable/disable process ID checking; add a source code line to the compiler source buffer; add partial source lines to the compiler source buffer; format and add source code to the compiler source buffer; erase all C source code from the compiler source buffer; obtain a pointer to the internal compiler source buffer; compile the code in the source buffer and return a handle to manage the generated code stream; and destroy the code generator instance. The APIs may also provide the following code stream services in order to: obtain the address of a generated function; obtain the name of a generated function; and destroy the code stream instance.

The following illustrates use of various APIs in the code generation process. When the generated code stream needs to call back into the application code, the application code exports code symbols in the form of function pointers to the code generator by using the following code:

```
void function(void)
{
    return 1;
}
tkgDefineExtern(tkgh, "function", function);
```

(Note: the tkgDefineExtern function defines external functions and uses three arguments: 1) handle to code generator, 2) name to export, 3) address of symbol.) The application would then submit code to define this function in the code stream as follows:

TkgAppendCSource(tkgh, "void function(void);\n", −1);

(Note: the TkgAppendCSource function adds a source code line to the compiler source buffer and uses three arguments: 1) handle to code generator, 2) string containing source to be added, 3) length of string (wherein −1 means NULL terminated).)

The code stream can now call the 'function'. Note that the calling conventions on some platforms require that a register be set up to point the global data area of each shared library (DLL). Because in this example, 'function' appears in a different shared library from the rest of the generated code stream, the direct function call is converted to a function pointer call, so the data pointer can be loaded as part of the normal calling sequence of a function pointer call.

When the generated code stream needs to access data in the application program, the application can export data to the code stream as follows:

```
int mtable[200];
. . .
tkgDefineExtern(tkgh, "mytable", mytable);
```

The application then submits the code to define symbol as an external data item.

tkgAppendCSource(tkgh, "extern int mytable[200];\n", −1);

Note that the generated code stream treats the data item as an external global symbol, but this symbol need not be a global symbol in the application program.

The routines tkgAppendCSource() and tkgFormatCSource() allow the application to submit "C" source code to the code generator. Once all the external symbols are defined, and all the "C" source has been submitted, the application calls tkgGenerate() to cause the source code to be compiled into machine code. This function construct a C function pointer that can be called from the context of the application program. On some architectures, this is returning the address of the code stream. On others, a function descriptor is created which contains the address of the code, and any other necessary information to make a successful function pointer call, i.e., address of the global data pointer. The function pointer obtained from tkgGetFuncAddr() can be cast to a function pointer of the appropriate type, and called like any other function pointer.

(Note that the tkgFormatCSource function formats and adds source code to the compiler source buffer and uses in this example the following arguments: 1) handle to code generator, 2) varargs "printf-style" list of arguments. The tkgGenerate function compiles the code in the source buffer and returns a handle to manage the generated code stream. The function uses in this example uses the following arguments: 1) handle to code generator, 2) IO (input/output) handle to write error messages to, 3) name of codestream (for debugger use). The tkgGetFuncAddr function in this example uses the following arguments: 1) handle to code stream, and 2) name of function.)

It is often desirable for generated code to reference data in structures defined by the application. Structures that the generated code stream references will need are defined in the incoming source code. To reduce the amount of dual maintenance in maintaining a structure definition in two locations (such as one in application header files, and the other in a series of tkgAppendCSource statements), a method is used to describe only the members that the code stream requires. If members are added to the application version, the offsets to the code stream version are automatically adjusted. To illustrate this, the tkgDefineStructList() API is discussed.

This API allows a structure to be defined for the generated code to use. If the application developer modifies the structure, the definition sent to the code generator is automatically updated (note that in this C language example, this would be due to the use of the standard C offsetof() operator).

First, a set of helper macros are defined as:

#define MEMSIZE(str,mem) sizeof(((str *)0)->mem)

#define TKMEMDEF(mem, str, decl) {#mem, MEMSIZE(struct str,mem), offsetof(struct str,mem), decl},

#define TKINTDEF(mem, str) TKMEMDEF(mem, str, "int % s")

#define TKLONGDEF(mem, str) TKMEMDEF(mem, str, "long % s")

#define TKDBLDEF(mem, str) TKMEMDEF(mem, str, "double % s")

#define TKPTRDEF(mem, str) TKMEMDEF(mem, str, "void * % s")

#define TKCHRDEF(mem, str) TKMEMDEF(mem, str, "char % s")

#define TKMEMEND {NULL,0,0,NULL}

The following provides a description of these macros:

- "#define MEMSIZE(str,mem) sizeof(((str *)0)->mem)" is used to determine the size of a member in a structure, where str is the structure name and mem is the member in the structure.
- "#define TKMEMDEF(mem, str, decl) {#mem, MEMSIZE(struct str,mem), offsetof(struct str,mem), decl}" is used to define a member of a structure, where mem is the member of the structure, str is the name of the structure, decl is a string that will be sent to the code generator that will be used to define the member.
- "#define TKINTDEF(mem, str) TKMEMDEF(mem, str, "int % s")" is used to define a member of type int based on TKMEMDEF above, where mem is the name of the member and str is the name of the structure.
- "#define TKLONGDEF(mem, str) TKMEMDEF(mem, str, "long % s")" is used to define a member of type long based on TKMEMDEF above, where mem is the name of the member and str is the name of the structure.
- "#define TKDBLDEF(mem, str) TKMEMDEF(mem, str, "double % s")" is used to define a member of type double based on TKMEMDEF above, where mem is the name of the member and str is the name of the structure.
- "#define TKPTRDEF(mem, str) TKMEMDEF(mem, str, "void * % s")" is used to define a member of pointer type based on TKMEMDEF above, where mem is the name of the member and str is the name of the structure.
- "#define TKCHRDEF(mem, str) TKMEMDEF(mem, str, "char % s")" is used to define a member of type char based on TKMEMDEF above, where mem is the name of the member and str is the name of the structure.
- "#define TKSTRUCTDEF(str, memlist) {#str, sizeof (struct str), memlist}" is used to define a structure with a list of members, where str is the name of the structure and memlist is the list of members.
- "#define TKMEMEND {NULL,0,0,NULL}" is used to mark the end of a structure.

These macros are used to set up a data structure representing a structure. As an example, suppose that we have the following structure called FOO:

```
struct FOO
{
    int a;
    double d;
    int aa;
    void *x;
    int aaa;
    void (*func)(int, double);
    int aaaa;
};
```

Suppose we wish to allow the generated code to have access to members 'a','d','x', and 'func'. A data structure may be set up and may describe a structure FOO as follows:

```
TKGMemDef FOO_memdefs[] =
{
    TKINTDEF(a, FOO)
    TKDBLDEF(d, FOO)
    TKPTRDEF(x, FOO)
    TKMEMDEF(func, FOO, "void (*%s)(int, double)")
    TKMEMEND
};
TKGStructDef structdefs[] =
{
    TKSTRUCTDEF(FOO, FOO_memdefs)
};
```

Then the application calls tkgDefineStructList() as follows:

tkgDefineStructList(tkgh, structdefs, 1);

(where the three arguments of tkgDefineStructList() are: 1) handle to code generator, 2) data structure defining the structure we want to export to generated code. 3) Number of structures.) Through this method, the struct FOO can be modified (e.g., additional members added), and the code to export it to generated code does not need to change (unless the generated code needs access to a new member).

Figure 10:
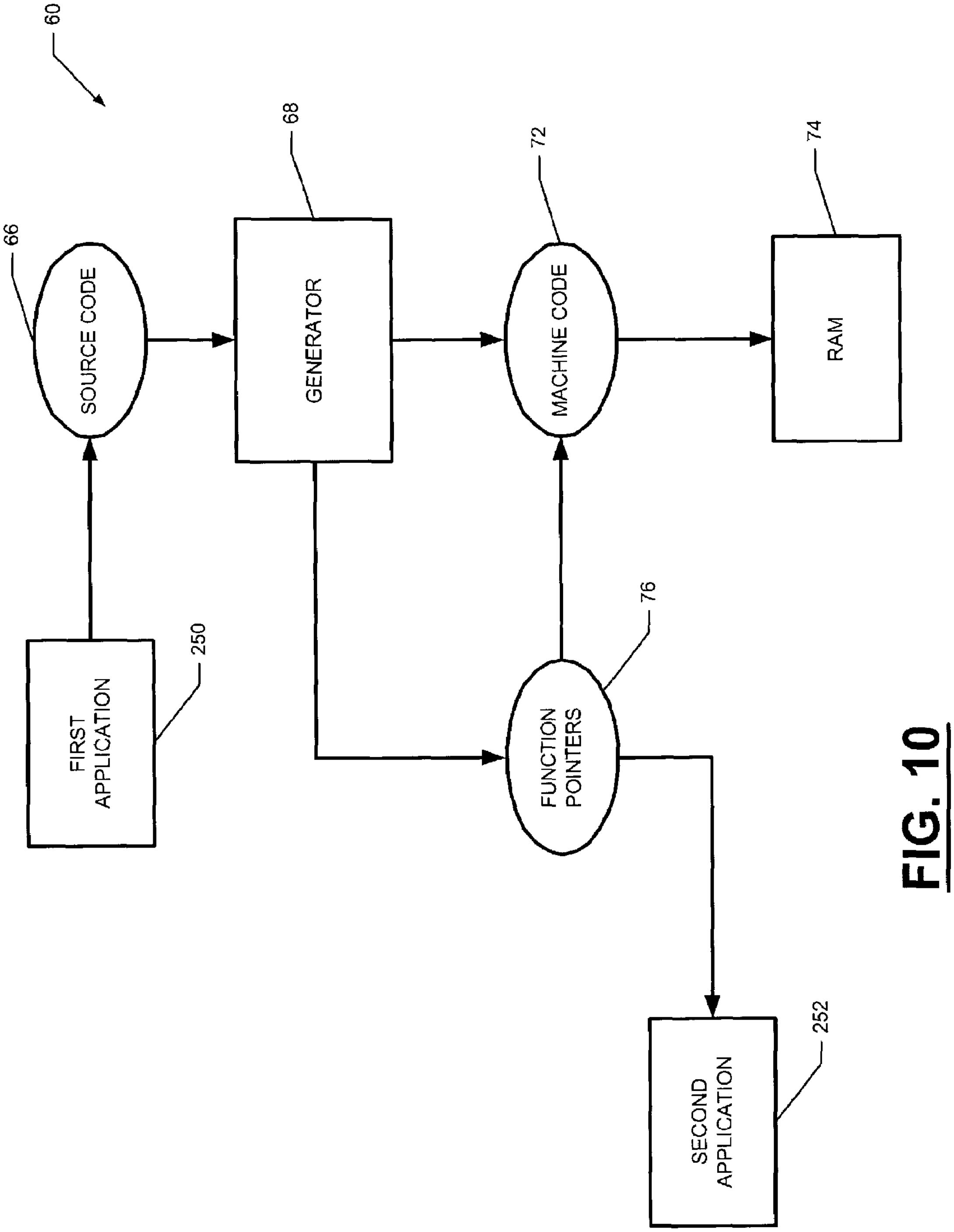
FIGS. 10-12 are block diagrams depicting additional uses for a code generation system.

While examples have been used to disclose the invention, including the best mode, and also to enable any person skilled in the art to make and use the invention, the patentable scope of the invention is defined by the claims, and may include other examples that occur to those skilled in the art. As an example of the wide scope attributable to the code generation system and method, FIG. 10 illustrates a different scenario wherein source code 66 is generated by a first application 250 for use by a second application 252. The first application 250 may send a message or set a semaphore to notify the second application 252 when it may access the function(s) contained in the machine code (or the second application can alternatively check to see if the designed function pointer is available). Also it should be understood that the code generation system and method may be used by multiple applications. Accordingly a third application can launch another generator program and submit source code to it so that the source code may be processed by the second generator program; or the third application may access the same generator program as the first application in FIG. 10.

Figure 11:
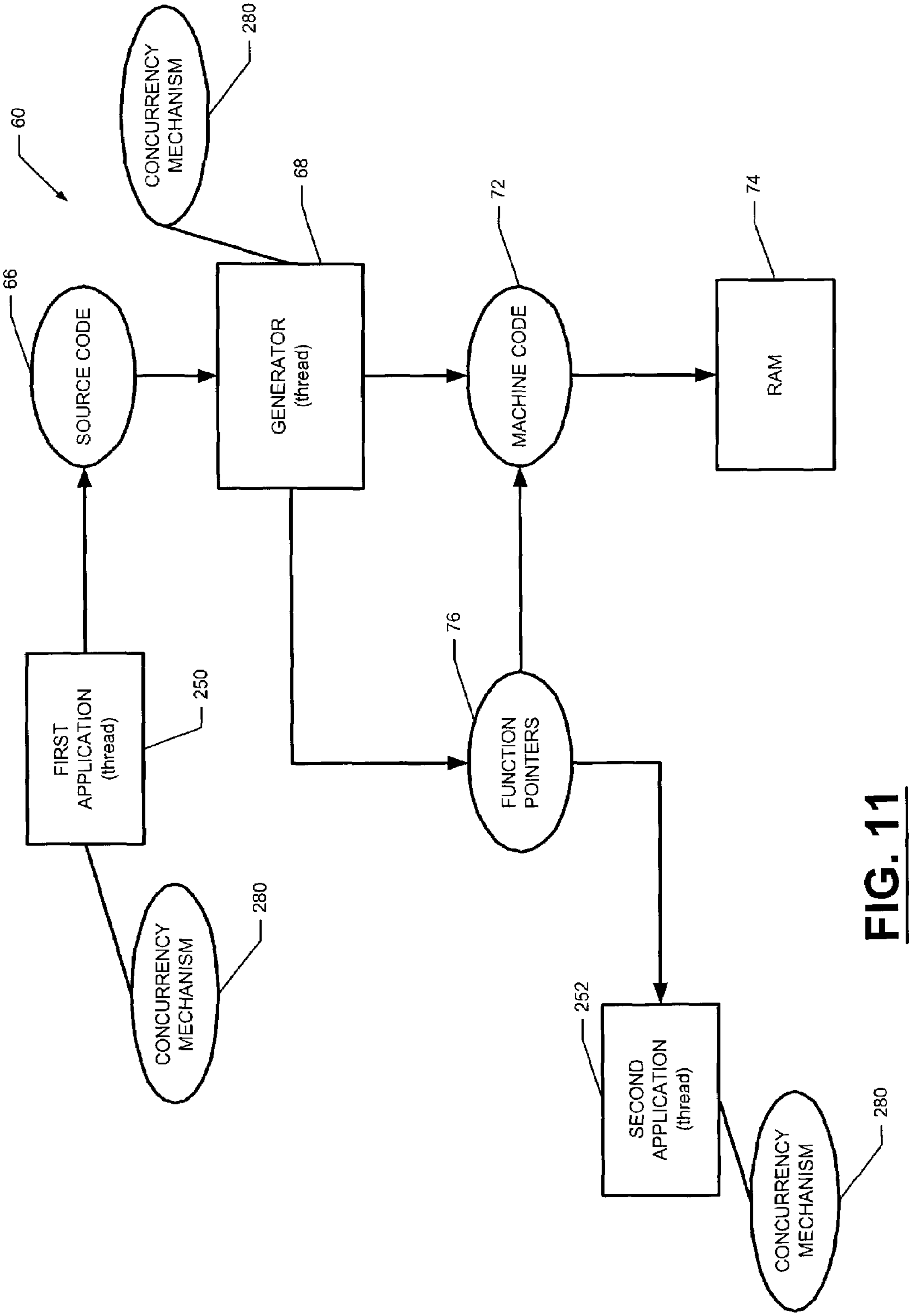

A wide range of computer applications may use the code generation system 60. As an illustration, FIG. 11 shows a multi-threaded system where the applications (250 and 252) and code generator 68 operate as threads. Concurrency mechanisms 280 as commonly used in the field are employed to notify when machine code 72 is available for use by an application.

Figure 12:
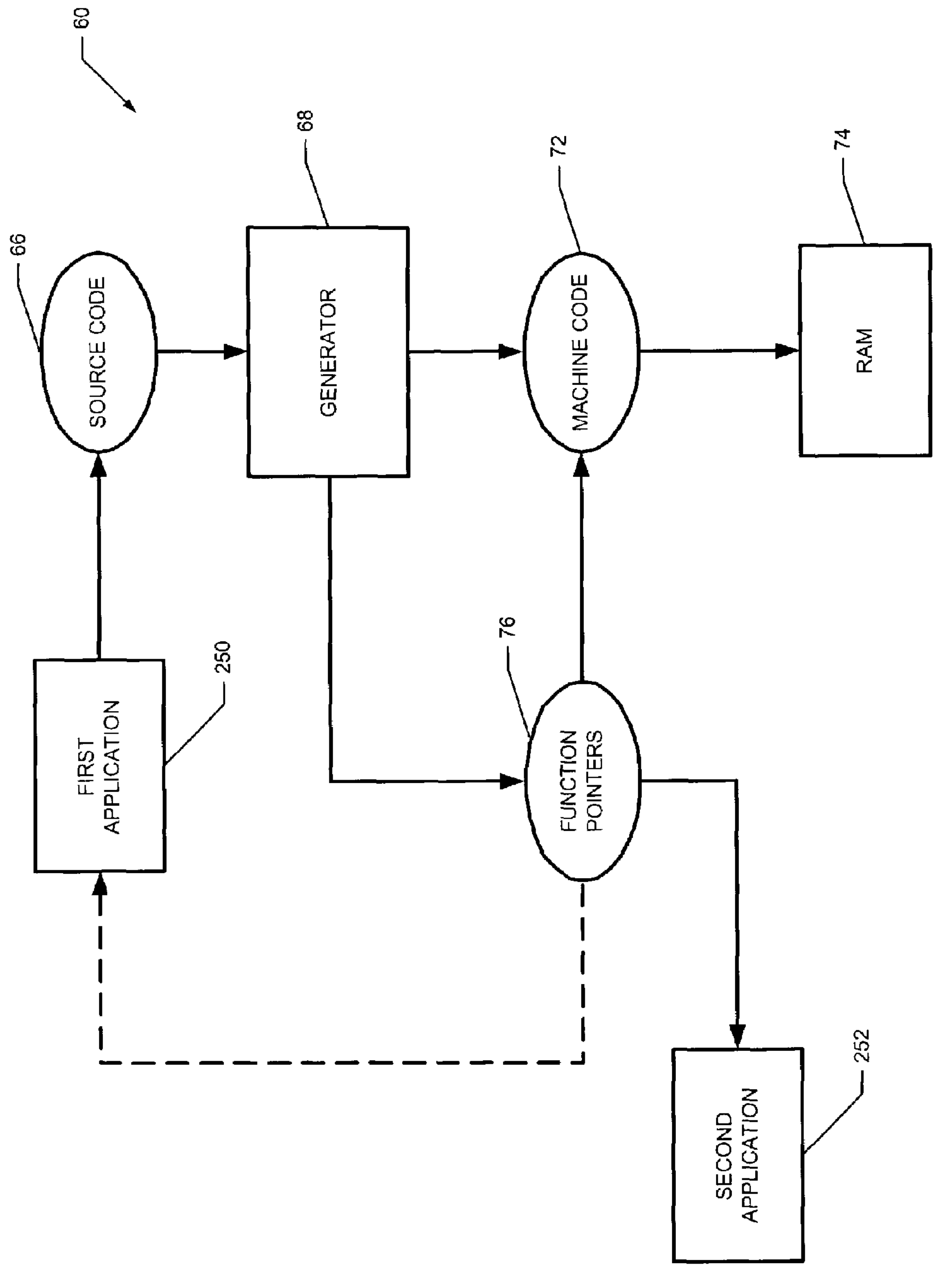

As shown in FIG. 12, the code generation system 60 allows the application 250 that generated the source code 66 for use by other applications 252 to also be able to access the functions contained in the machine code 72.

The code generation system may be used on many different types of computer architectures and may be implemented in different ways. As an illustration, the generator module may co-exist on the same computer or device that contains the applications that generate and use the machine code. In another implementation, the generator module may reside on a first computer while the applications reside on a second computer; the generated machine code is placed directly into RAM device(s) that the applications can access. Also, the code generation software may be stored on many different types of computer readable media, such as for storage, delivery to a user, for execution, etc., as well as using a flash memory device (that is in the address space of the program that generates the source code) in substitution for the RAM device.

Figure 13:
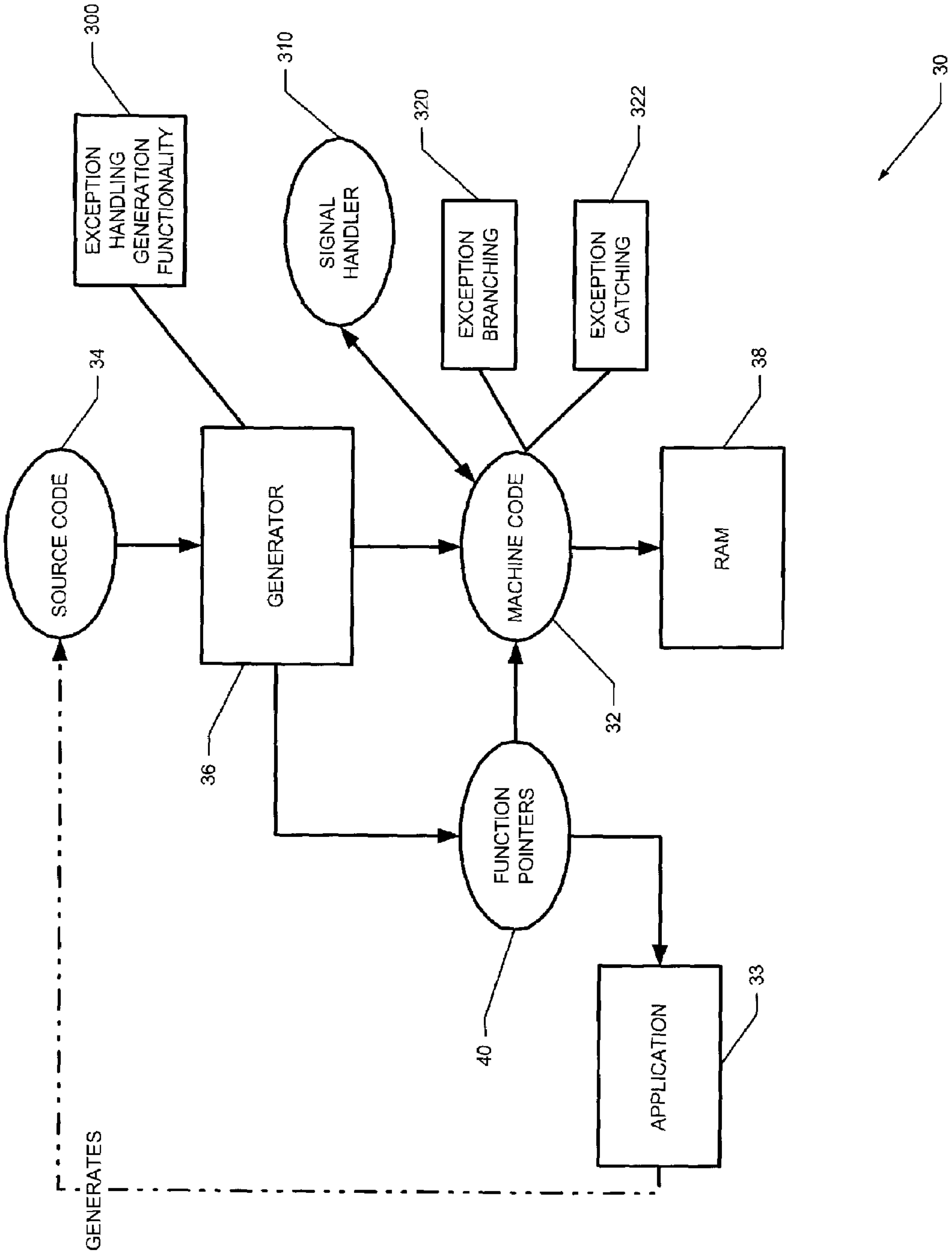
FIG. 13 is a block diagram depicting exception handling techniques involving a code generation system.

As a further example of the wide scope of the code generation system, the code generation system may be tailored to perform run-time exception handling more efficiently. With reference to FIG. 13, the code generation system 30 uses an exception handling generation extension 300 to add exception branching functionality 320 and exception catching functionality 322 for when an exception happens.

When an exception happens, an exception signal handler 310 allows execution to resume at the recovery code contained within the exception catching functionality 322. The exception signal handler 310 accomplishes this by placing the value stored from the exception branching functionality 320 into the PC (program counter) slot of the exception context structure that was passed to the exception signal handler 310. The exception signal handler 310 then returns, and execution continues via the exception catching functionality 322.

Figure 14:
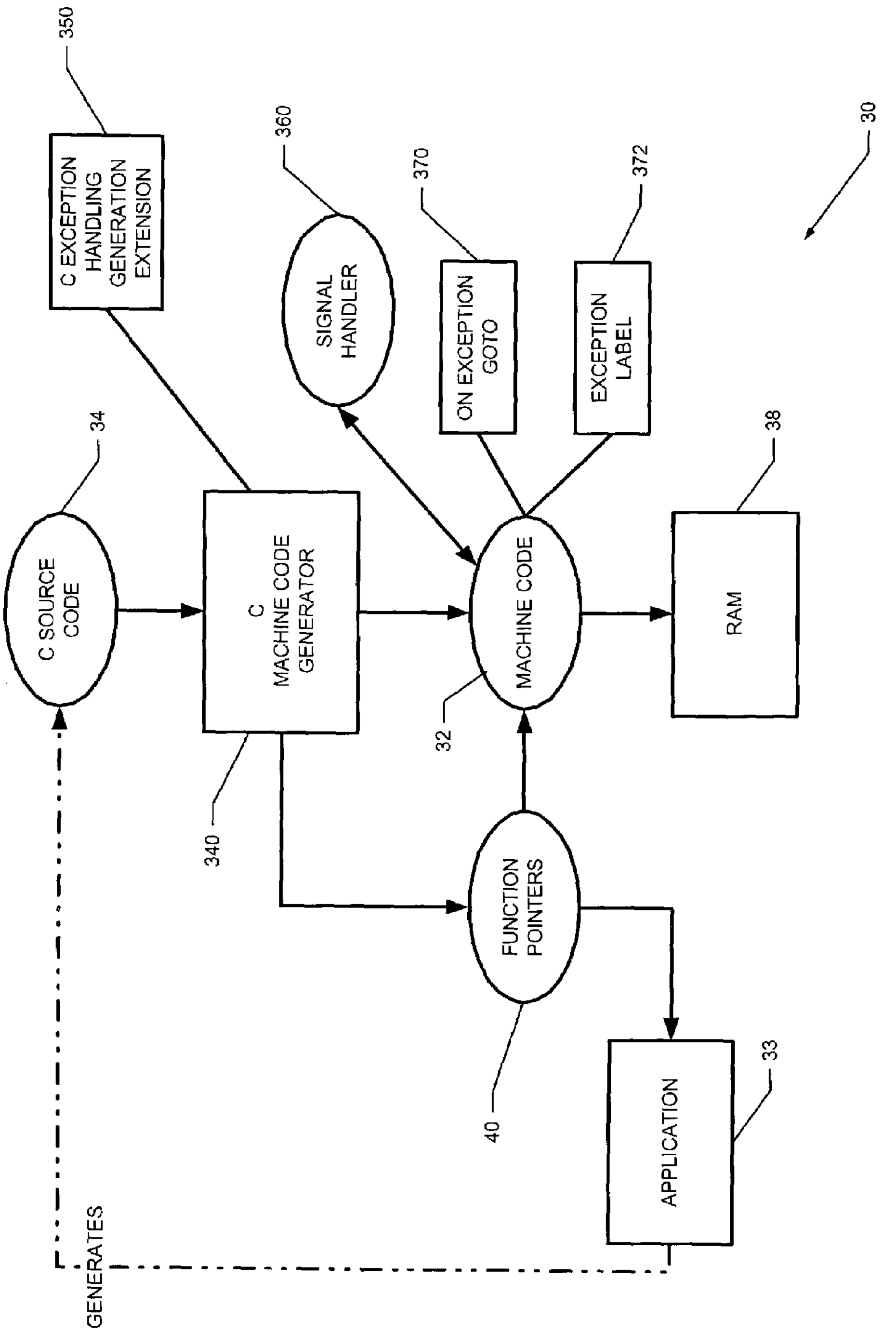
FIG. 14 is a block diagram depicting exception handling techniques involving a C code generation system.

The exception handling techniques may be used with source code of many different types of higher order languages, such as C, FORTRAN, Pascal, assembly, etc. FIG. 14 shows an example where an exception handling generation extension 350 allows a C machine code generator 340 to add to generated machine code 32 exception functionality that may resemble:

```
    ON_EXCEPTION_GOTO(label);
    . . .
    [code goes here that could possible cause an exception]
    . . .
EXCEPTION_LABEL(label)
    . . .
    [recovery code to continue after an exception goes here]
    . . .
```

The ON_EXCEPTION_GOTO() statement 370 is a relatively fast operation that records the location of the recovery code located at the exception label 372. The ON_EXCEPTION_GOTO() statement 370 may be placed at any point within the generated source code 34. For example, the ON_EXCEPTION_GOTO() statement 370 may be placed in the beginning of the generated source code 34 in order to have exception handling techniques available from the execution's start. Because the exception-related statements (370 and 372) are being generated on-the-fly by the application 33 (e.g., a data mining application, a database application, a statistical application, etc.), the exception handling statements (370 and 372) may be tailored/customized for the situation at hand. The customization may include placing one or more of the exception-related statements (370 and 372) in different locations within the generated source code 34 based upon the application's current execution context. The customization may also include generating different recovery code based upon the application's current execution context. For example, the program may have attempted to compute a multiplication of two very large numbers. This would cause a floating point overflow exception. The recovery code could choose to set the result to the largest possible floating point number, and continue execution.

With the extension 350, the C machine code generator 340 can generate on-the-fly machine code 32 directly into RAM such that execution resumes at the EXCEPTION_LABEL() statement 372 no matter where in the machine code 32 the exception happens. To resume execution at the recovery code, an exception signal handler 360 places the value stored from the ON_EXCEPTION_GOTO() statement 370 into the PC (program counter) slot of the exception context structure that was passed to the exception signal handler 360. The exception signal handler 360 then returns, and execution continues at the EXCEPTION_LABEL() statement 372.

It is noted that the recovery code can perform any actions necessary or useful for handling the exception at hand. For example, the recovery code may allow the executing program to recover from the exception, activate a debugging program to analyze the exception, or terminate the program gracefully.

The run-time exception handling techniques allow for the reduction or the elimination of having to continually save the context of an executing program when trapping for exceptions. Moreover, the exception handling functionality may be extended to allow exception handling code to be generated by the code generator that allows the exception handling to be turned off as well as turned back on.

The exception handling functionality may also handle many types of exceptions, such as for example I/O interrupts (e.g., a person hitting control C while the program is executing), null pointer exceptions, overflow errors, or index outside the bounds of an array, etc. Other exception handling may include the recovery code allowing locks to be properly released if the program is involved in a concurrency situation.

Figure 15A:
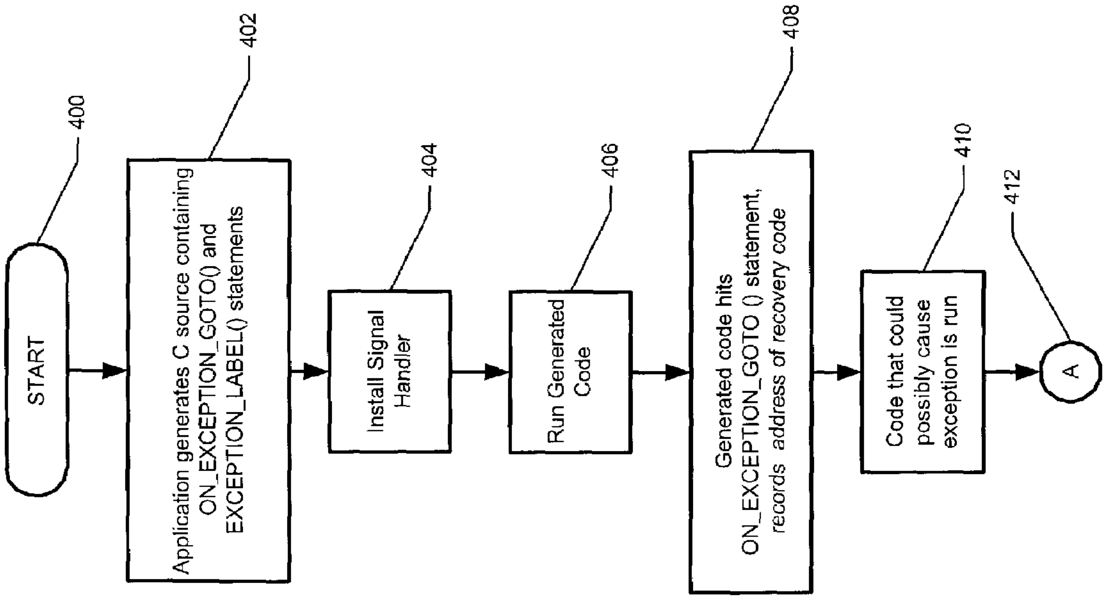
FIGS. 15A and 15B are flowcharts depicting exemplary operational steps for exception handling techniques involving the code generation system of FIG. 14.
Figure 15B:
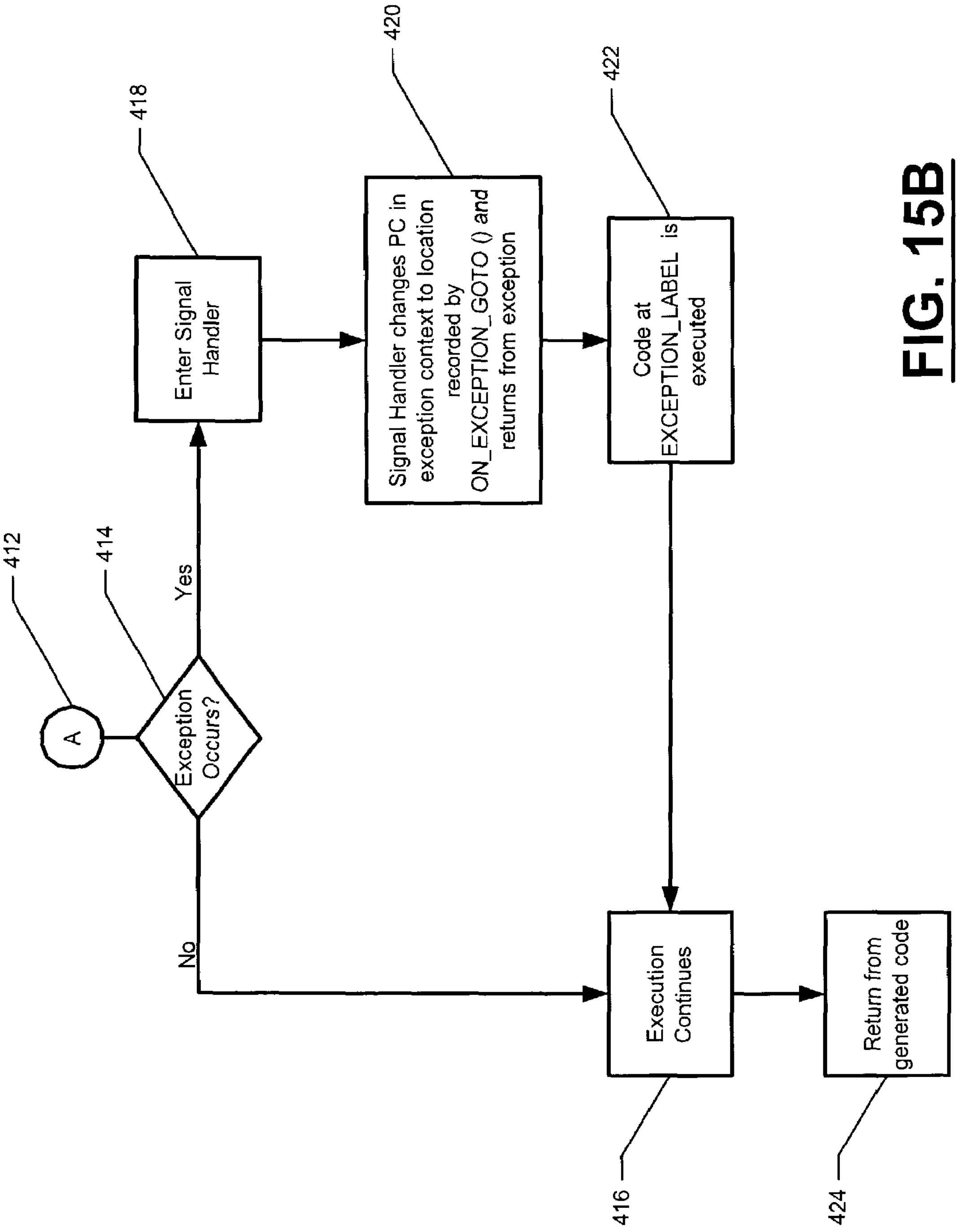

FIGS. 15A and 15B depict exemplary operational steps for exception handling techniques involving the C code generation system of FIG. 14. With reference to FIG. 15A, start block 400 indicates that process block 402 executes. At process block 402, an application generates C source code that contains an ON_EXCEPTION_GOTO() and EXCEPTION_LABEL() statements, and process block 404 installs a signal handler.

At process block 406, a code generator module generates machine code directly to RAM from the source code and allows the application to access the functions contained in the machine code. At process block 408, the generated machine code hits the ON_EXCEPTION_GOTO() statement which causes the address of the recovery code to be recorded. Within the generated machine code, the code portion that could possibly cause an exception is executed at process block 410. Processing continues on FIG. 15B as indicated by continuation block 412.

With reference to FIG. 15B, decision block 414 examines whether an exception has occurred during execution. If no exception occurred, then execution continues at process block 416 before processing returns from the generated machine code at process block 424.

However if an exception had occurred as determined by decision block 414, then the signal handler is invoked at process block 418. At process block 420, the signal handler changes the PC in the exception context to the location recorded by the ON_EXCEPTION_GOTO() and returns from the exception. At process block 422, the recovery code at the EXCEPTION_LABEL is executed, and execution continues at process block 416 before processing returns from the generated machine code at process block 424.

It is claimed:

1. A computer-implemented method for generating machine code to be embedded in a user application said method comprising the steps of:

receiving source code generated by the user application;

receiving user application exported addresses of code and of data symbols that are used to resolve external references in the source code;

wherein the source code includes one or more higher order computer language statements;

wherein a generator generates machine code directly into random access memory (RAM) from the received source code; and the generator providing a function pointer to the generated machine code stored in the RAM to the user application so that the user application may access the generated machine code;

wherein the user application contains instructions to dynamically create the source code during run-time execution of the user application;

wherein the source code dynamically created by the user application during run-time execution is used to generate the machine code accessed via the function pointer;

wherein the generated machine code runs in same context as the user application;

wherein the generated machine code is embedded in the user application and adds functionality to the user application.

2. The method of claim 1 wherein the source code is formatted as text.

3. The method of claim 1 wherein the one or more higher order level computer language statements are based upon assembly language.

4. The method of claim 1 wherein the user application operates as a thread.

5. The method of claim 1 wherein machine code is computer machine readable code.

6. The method of claim 5 wherein the machine code comprises physical memory addresses.

7. The method of claim 1 wherein the machine code is generated at run-time.

8. The method of claim 7 wherein the machine code is generated during execution of the user application.

9. The method of claim 1 wherein the user application uses an application programming interface (API) to submit the source code for generating the machine code.

10. The method of claim 1 wherein the user application uses an application programming interface (API) means for submitting the source code for generating the machine code.

11. The method of claim 1 wherein data symbols, function symbols and structures are exported from the user application.

12. The method of claim 11 wherein the machine code utilizes the exported addresses and data symbols so tat the machine code may call back into the code of the user application.

13. The method of claim 1 further comprising the step of:

performing relocation during generation of the machine code.

14. The method of claim 13 wherein the generating step does not include a link or load phase.

15. The method of claim 13 further comprising the step of:

performing a code to code relocation within a generated function of the machine code.

16. The method of claim 13 further comprising the step of performing a code to code relocation between two generated functions of the machine code.

17. The method of claim 13 further comprising the step of:

performing a data to code relocation between generated data and generated function of the machine code.

18. The method of claim 13 further comprising the step of performing a code to data relocation between generated function and generated data of the machine code.

19. The method of claim 13 further comprising the step of:

performing a data to data relocation for generated data of the machine code.

20. The method of claim 1 further comprising the step of:

setting a compiler option to affect the generation of the machine code.

21. The method of claim 1 further comprising the step of:

freeing resources associated with the generated machine code.

22. The method of claim 1 further comprising the step of:

freeing resources associated with the generated machine code after the generated machine code has executed.

23. The method of claim 1 further comprising the step of:

freeing memory associated with the generated machine code.

24. The method of claim 1 further comprising the step of:

using a debugger to analyze a compilation error associated with the generation of the machine code.

25. The method of claim 1 further comprising the step of:

using debugger means to analyze the generated machine code.

26. The method of claim 1 wherein the source code is directed to a B*tree operation, wherein the user application contains instructions to generate differently source code based upon whether concurrency is desired or not.

27. The method of claim 1 wherein the source code is directed to a B*tree operation, wherein the user application contains instructions to generate different source code for when different key types are requested.

28. The method of claim 27 wherein the generated source code is customized based upon dimension count.

29. The method of claim 28 wherein the generated source code is customized based upon complex keys having more than one data type.

30. The method of claim 1 wherein the source code is directed to a B*tree operation, wherein the user application contains instructions to generate different source code based upon whether a dimension count dependent for-loop is needed for the B*tree operation.

31. The method of claim 1 wherein the source code is directed to a B*tree operation, wherein the user application contains instructions to generate different source code for when different key types are requested.

32. The method of claim 1 wherein the source code is directed to a B*tree operation, wherein the user application contains instructions to generate different source code for when no paging is requested.

33. The method of claim 32 wherein paging is not requested when an index can fit entirely in-memory.

34. The method of claim 1 wherein the source code is directed to a B*tree operation, wherein the user application contains instructions to generate different source code for when multiple inserts of the same key are requested.

35. The method of claim 1 wherein the user application generates the source code, said source code containing a structure that references data in a structure contained within the user application.

36. The method of claim 35 wherein the source code defines only the data that the generated machine code requires for its operation.

37. The method of claim 35 wherein the structure contained within the source code is updated if the structure contained within the application is modified.

38. The method of claim 37 wherein additional members are added to the structure contained within the application, wherein offsets to the structure contained within the source code are automatically updated.

39. A computer-implemented apparatus for generating machine code to be embedded in a user application, comprising:

a generator module that generates machine code directly into random access memory (RAM) from source code and exports addresses of code and of data symbols that are used to resolve external references in the source code, said source code including a higher order computer language statement, said source code and said exported addresses having been provided to the generator module by the user application;

a relocation handler that performs relocation operations during generation of the machine code;

said generator module providing a function pointer to the generated machine code stored in the RAM to the user application so that the user application may access the generated machine code;

wherein source code is created dynamically during run-time execution of the user application;

wherein the source code that is dynamically created during run-time execution is used to generate the machine code accessed via the function pointer;

wherein the generated machine code is for running in same context as the user application;

wherein the generated machine code is embedded in the user application and adds functionality to the user application.

40. A computer-implemented apparatus for generating machine code to be embedded in a user application process, comprising:

means for receiving source code generated by the user application;

means for receiving exported addresses of code and of data symbols from the user application, wherein the addresses are used to resolve external references in the source code;

wherein the source code includes one or more higher order computer language statements;

generator means for generating machine code directly into random access memory (RAM) from the received source code and the exported addresses; and means for the generator means to provide a function pointer to the generated machine code stored in the RAM to the user application so that the user application may access the generated machine code;

wherein the user application contains instructions to dynamically create source code during run-time execution of the user application;

wherein the source code dynamically created by the user application during run-time execution is used to generate the machine code accessed via the function pointer;

wherein the generated machine code runs in same context as the user application;

wherein the generated machine code is embedded in the user application and adds functionality to the user application.

41. The apparatus of claim 40 further comprising:

an application having code generation means for generating the source code.

42. The apparatus of claim 41 wherein the code generation means comprises structure generation means.

43. Computer software stored on a computer readable media for generating machine code to be embedded in a user application the computer software comprising program code for carrying out a method comprising the steps of:

receiving source code generated by the user application;

receiving exported addresses of code and of data symbols from the user application, wherein the addresses are used to resolve external references in the source code;

wherein the source code includes the one or more higher order computer language statements;

using a generator to generate machine code directly into random access memory (RAM) from the received source code and the addresses; and the generator providing a function pointer to the generated machine code stored in the RAM to the user application so that the user application may access the generated machine code;

wherein the user application contains instructions to dynamically create source code during run-time execution of the user application;

wherein the source code dynamically created by the user application during run-time execution is used to generate the machine code accessed via the function pointer;

wherein the generated machine code runs in same context as the user application;

wherein the generated machine code is embedded in the user application and adds functionality to the user application.

44. A computer-implemented apparatus for accessing machine code comprising:

a source code generation module to generate source code and export addresses of code and of data symbols, said source code including a higher order computer language statement, and said exported addresses resolving external references in the source code, said source code and exported addresses to be provided to a generator module so that the generator module may generate machine code directly into random access memory (RAM) from the source code; and said generator module to provide a function location software mechanism to access the generated machine code stored in the RAM to a user application;

wherein the source code generation module is said user application and contains instructions to dynamically create source code and export addresses of code and of data symbols during run-time execution of the user application;

wherein the source code and exported addresses dynamically created by the user application during run-time execution are used to generate the machine code accessed by the user application via the function location software mechanism;

wherein the generated machine code is for running in same context as the user application;

wherein the generated machine code is embedded in the user application and adds functionality to the user application.

45. The apparatus of claim 44 wherein the function location software mechanism comprises an application programming interface (API) mechanism to access the generated machine code stored in the RAM through a function pointer provided by the generator module.

46. The apparatus of claim 44 further comprising:

wherein the source code generation module comprises code generation means for generating the source code.

47. The apparatus of claim 46 wherein the code generation means comprises structure generation means.

48. The apparatus of claim 46 wherein the code generation means comprises exception handling code generation means.

49. The apparatus of claim 48 wherein the exception handling code generation means generates higher order computer language statements that include an exception branching statement means and an exception catching statement means.

50. A computer-implemented method for handling run-time exceptions by generating machine code to process the exceptions by a user application, comprising the steps of:

receiving source code that was created by the user application, wherein the received source code includes one or more higher order computer language statements, wherein the statements include an exception branching statement and an exception catching statement;

receiving user application exported addresses of code and of data symbols that are used to resolve external references in the source code;

wherein a generator generates machine code directly into random access memory (RAM) from the received source code; and the generator providing a function pointer to the generated machine code stored in the RAM to the user application so that the user application may access the generated machine code, wherein upon an exception occurring, execution of the generated machine code branches to the exception catching statement in accordance with the exception branching statement;

wherein the generated machine code runs in same context as the user application;

wherein the generated machine code is embedded in the user application and adds functionality to the user application.

51. The method of claim 50 wherein upon an exception happening, an exception signal handler allows execution to resume at recovery code associated with the exception catching statement.

52. The method of claim 51 wherein the exception signal handler allows execution to resume at the recovery code by placing the value stored from the exception branching statement into a PC (program counter) slot of an exception context structure that was passed to the exception signal handler.

53. The method of claim 52 wherein the exception branching statement includes ON_EXCEPTION_GOTO statement means.

54. The method of claim 53 wherein the exception catching statement includes EXCEPTION_LABEL statement means.

55. The method of claim 53 wherein the ON_EXCEPTION_GOTO statement means records location of the recovery code.

56. The method of claim 50 wherein the user application automatically generates the source code dynamically during execution of the user application.

57. The method of claim 56 wherein the user application customizes the recovery code based upon current context of the executing user application.

58. The method of claim 50 wherein the user application customizes the recovery code based upon current context of the executing user application.

59. The method of claim 50 wherein the user application comprises a data mining application.

60. The method of claim 50 wherein the user application comprises a database application.

61. The method of claim 50 wherein the user application comprises a statistical application.

62. The method of claim 50 wherein use of the exception branching statement reduces need for saving the context of the executing generated machine code when trapping for exceptions.

63. Computer software stored on a computer readable media, the computer software comprising program code for carrying out a method according to claim 50.

64. Computer software stored on a computer readable media for handling run-time exceptions by generating machine code to process the exceptions by a user application, the computer software comprising program code for carrying out a method comprising the steps of:

receiving source code that was created by the user application, wherein the received source code includes one or more higher order computer language statements, wherein the statements include an exception branching statement and an exception catching statement;

receiving user application exported addresses of code and of data symbols that are used to resolve external references in the source code;

wherein in a generator generates machine code directly into random access memory (RAM) from the received source code; and the generator providing a function pointer to the generated machine code stored in the RAM to the user application so that the user application may access the generated machine code, wherein upon an exception occurring, execution of the generated machine code branches to the exception catching statement in accordance with the exception branching statement;

wherein the generated machine code runs in same context as the user application;

wherein the generated machine code is embedded in the user application and adds functionality to the user application.

65. A computer-implemented apparatus for handling run-time exceptions by generating machine code to process the exceptions by a user application, comprising:

means for receiving the generated source code that was created by the user application, wherein the received source code includes one or more higher order computer language statements means, wherein the statements means include an exception branching statement means and an exception catching statement means;

means for receiving user application exported addresses of code and of data symbols that are used to resolve external references in the source code;

generator means for generating machine code directly into random access memory (RAM) from the received source code and the exported addresses; and means for the generator means to provide a function pointer to the generated machine code stored in the RAM to the user application so that the user application may access the generated machine code, wherein upon an exception occurring, execution of the generated machine code branches to the exception catching statement means in accordance with the exception branching statement means;

wherein the generated machine code runs in same context as the user application;

wherein the generated machine code is embedded in the user application and adds functionality to the user application.

66. A computer-implemented apparatus for handling runtime exceptions by a user application, comprising:

a generator module that generates machine code directly into random access memory (RAM) from source code and exports addresses of code and of data symbols that are used to resolve external references in the source code, said source code including the one or more higher order computer language statements, wherein the statements include an exception branching statement and an exception catching statement, said source code and said exported addresses having been provided to the generator module by the user application;

a relocation handler that performs relocation operations during generation of the machine code;

said generator module providing a function pointer to the generated machine code stored in the RAM to the user application so that the user application may access the generated machine code, wherein upon an exception occurring, execution of the generated machine code branches to the exception catching statement in accordance with the exception branching statement, wherein use of the exception branching statement eliminates need for saving the context of the executing generated machine code when trapping for exceptions;

wherein the generated machine code is for running in same context as the user application;

wherein the generated machine code is embedded in the user application and adds functionality to the user application.

67. The method of claim 1, wherein the machine code represents a single compilation unit created in memory with all internal references resolved during the generating step, and external references are bound to exported data and code symbols wherein the external references are bound according to symbolic information received from the user application, and execution of the generated code does not require a link or load phase;

wherein the absolute address of all symbols is known during the generation of the machine code.

68. The method of claim 67, further comprising launching a debugger configured to debug the user application and the dynamically created source code in the same process;

wherein the debugger also has access to dynamically created source and symbolic information.

* * * * *

UNITED STATES PATENT AND TRADEMARK OFFICE

CERTIFICATE OF CORRECTION

PATENT NO. : 7,320,121 B2 
APPLICATION NO. : 10/210831
DATED : January 15, 2008
INVENTOR(S) : Krueger It is certified that error appears in the above-identified patent and that said Letters Patent is hereby corrected as shown below:

Column 12, line 2, delete “tat” and insert -- that --.

Column 12, line 12, insert a colon after the second instance of the word “of”.

Column 12, line 13, insert a colon after the second instance of the word “of”.

Column 12, line 66, delete “different” and insert -- differently --.

Column 13, line 55, delete “process”.

Column 14, line 24, insert a comma after the word “application”.

Column 14, line 30, delete “the”.

Column 14, line 53 insert a comma after the word “code”.

Column 17, line 1, delete “generated”.

Column 17, line 33, delete “the”.

Signed and Sealed this

Twenty-ninth Day of April, 2008

JON W. DUDAS
*Director of the United States Patent and Trademark Office*